Oct. 20, 1925.

B. W. TRAYLOR

ANTISLAP PISTON RING

Filed Aug. 23, 1924

Inventor:
Bruce W. Traylor,
by Spear, Middleton, Donaldson & Hall
Attys.

Patented Oct. 20, 1925.

1,557,745

UNITED STATES PATENT OFFICE.

BRUCE W. TRAYLOR, OF PHILADELPHIA, PENNSYLVANIA.

ANTISLAP PISTON RING.

Application filed August 23, 1924. Serial No. 733,805.

*To all whom it may concern:*

Be it known that I, BRUCE W. TRAYLOR, a citizen of the United States, and resident of Philadelphia, in the county of Philadelphia and State of Pennsylvania, have invented certain new and useful Improvements in Antislap Piston Rings, of which the following is a specification.

My present invention relates to a piston ring which will prevent the slap and rattle common to pistons, particularly of the internal combustion engine type, once the piston has become worn.

The principal object of the invention is the provision of a ring which will be positive in its action and which will automatically take up the wear of the piston as it occurs.

Another and important object of the invention is the provision of means as above which may be applied to the ordinary pistons now in use in such engines, without extensive change to the pistons.

It is well known, particularly with pistons in internal combustion engines where the cylinders are arranged vertically or at an angle to the horizontal, that when the piston or the cylinder wall become worn so that there is play between the piston and the cylinder wall, a slap occurs which is caused by slight movement of the piston in a direction at right angles to the axis of the wrist pin. This slap makes itself known by a distinct knock or pounding, which is not only annoying, but is decidedly detrimental to the engine itself.

Various forms of piston rings have been devised to overcome this slap by causing said piston rings to press outwardly against the cylinder wall, but due to the fact that as soon as the rings themselves wear they are no longer in contact at their rear face with the piston itself, a slap is allowed to occur between the piston and the ring, and the remedy thus applied is ineffective.

My invention therefore, is aimed to overcome the defects caused by the wear of the piston or the cylinder wall, as above mentioned, and contemplates the use of a piston ring mounted in grooves distinct and apart from those ordinarily provided for the pressure rings. These piston rings are mounted eccentrically with the vertical axis of the piston, although the outer surface of my piston ring comprises a part of a cylindrical surface. This piston ring comprises a ring having a thick portion which tapers uniformly down to a thinner portion. A groove is provided in the piston to form a seat for said ring, of a similar form, that is, the thickened portion of the ring fits in the tapered portion of the groove and the groove extends around the piston of a depth decreasingly constantly as the thickness of the ring decreases so that the surfaces of the cylinder and the ring are substantially flush. Where it is desired to make the ring in one piece, the inner surface thereof takes the form of a spiral, the outer face being cylindrical. It is usually desirable, however, that the ring be formed of complementary and similar parts provided with means at their thick ends for separating said ends. In as much as the only separation of the ends which can take place with the piston and the piston ring in the cylinder, is to slide in the groove in which it is seated, it will be evident that the diameter of the piston including the ring at any point of the ring, increases constantly. In this way, as the piston or as the cylinder wall wears, the ring, under the influence of its separating means, increases the diameter of the piston to compensate for this wear and thus maintains a tight fit in the cylinder bore.

I have illustrated in the accompanying drawings a preferred form of the invention and a modified form, although I do not wish to be limited thereto, as these forms simply illustrate the principle involved.

In these drawings:—

Figure 1:
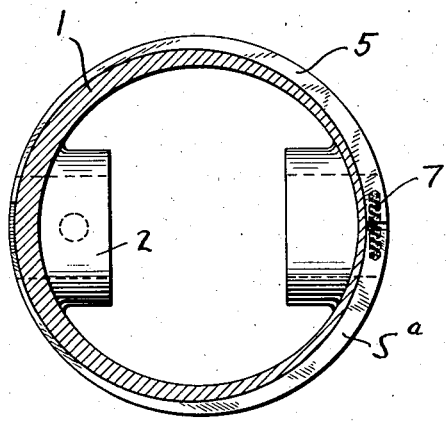
Figure 1 is a sectional plan view along the line 1—1 of Fig. 2, illustrating one form of the invention.

In the drawings I have illustrated the conventional form of piston at 1 provided with the usual wrist pin bearings 2, and having the ordinary pressure rings 3 seated in peripheral grooves 4. At points preferably above and below the wrist pin bearings 2 I provide in the preferred form, a continuous channel or groove around the piston, beginning at a point directly over the axis of the wrist pin bore. This groove is of constantly decreasing depth, the bottom of the groove, however, maintaining a cylindrical form, which thus causes the bottom of the groove or channel to be eccentric to the axis of the piston itself. Within this groove I place a two-part piston ring shown at 5 and 5ª, having a thickened portion, each provided with sockets 6 within which is seated a spring 7, which thus tends to separate the ends of the complementary parts 5 and 5ª. Each of the complementary parts of the piston ring is formed so that its thickness constantly decreases, its outer and inner face maintaining a cylindrical form. The thinner ends of the parts 5 and 5ª are slightly separated in order to allow the two parts to slip peripherally in the groove within which they are seated. I have found it desirable to provide two springs 7, each one supplementing the work of the other. It is also desirable to provide a pin 8 secured in the piston wall and extending between the separated ends of the parts 5 and 5ª, which pin prevents accidental displacement. It will be very clear that as the cylinder wall of the piston wears, the springs 7 will exert pressure upon the thickened ends of the complementary parts 5 and 5ª, thus causing each part to slide around in the groove within which they are seated, which causes the thinner ends to approach each other. Movement in this direction causes the outer face of the composite ring to increase in diameter over the normal diameter of the piston to an extent equal to the wear. It is also quite evident that by sufficiently separating the thinner ends of the composite ring, this action may continue until the ring itself is worn out.

Figure 3:
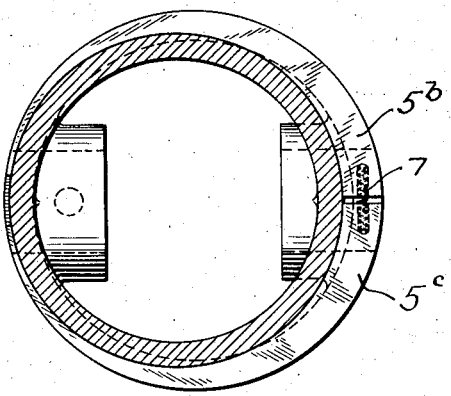
Fig. 3 is a sectional plan along the line 3—3 of Fig. 4.
Figure 2:
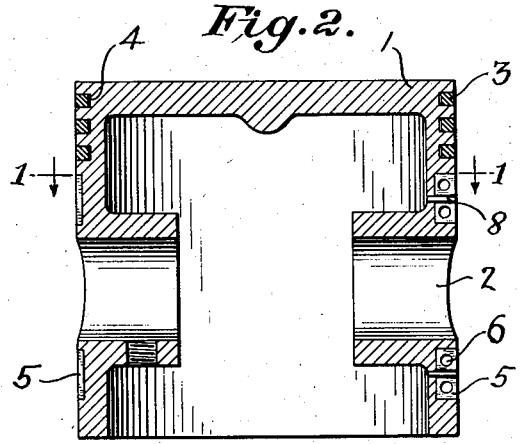
Fig. 2 is a sectional side elevation through the center of the wrist pin bearing, of the piston embodying my invention.
Figure 4:
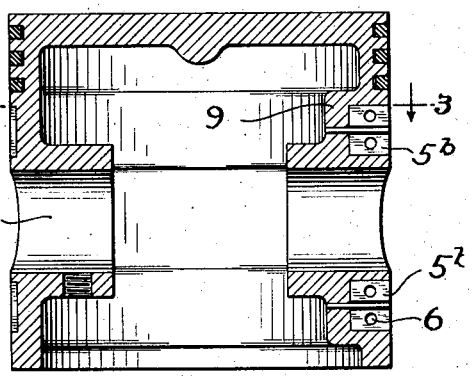
Fig. 4 is a sectional side elevation of a piston showing a piston ring heavier than that illustrated in Figs. 1 and 2.

By referring to the form shown in Figs. 1 and 2, it will be noted that in cutting the groove for the composite ring, the piston wall has been weakened or made thinner on one side than on the other. It may, therefore, be desirable to build up the inner surface of the piston to an extent to compensate for this circumstance. Such a modification is shown in Figs. 3 and 4. By referring to this form it will be noted that the complementary parts 5ᵇ and 5ᶜ are of a thickness at their large end greater than the normal thickness of the piston wall. This is sometimes desirable as such a ring will not only have a greater wear than that form shown in Figs. 1 and 2, but movement around the piston in its groove will cause a greater increase in diameter than the form shown in Figs. 1 and 2. This is due to the greater difference in thickness between its thick and thin end. In order to prevent the piston 1 from becoming weakened, I have shown a built up backing 9, which may begin from nothing adjacent the thin ends of the rings 5ᵇ and 5ᶜ, and built up to a thickness adjacent the thick ends of the ring 5ᵇ and 5ᶜ equal to the desired thickness of the cylinder wall. The operation of the form shown in Figs. 3 and 4 is identical with that in Figs. 1 and 2, with the exception as above noted that the increase in diameter due to movement under action of its spring 7, is greater than in the before-mentioned form.

Figure 5:
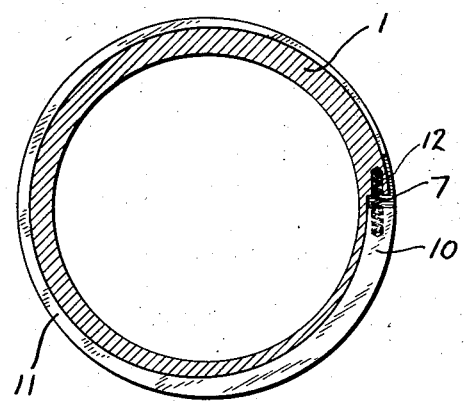
Fig. 5 is a sectional plan view of a piston embodying a modified form of ring.
Figure 6:
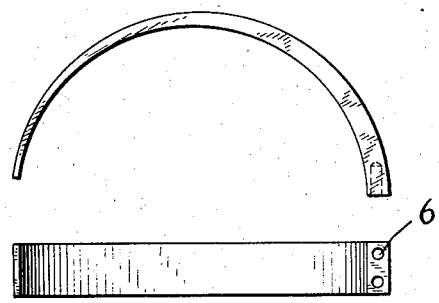
Fig. 6 is a detail of the ring of Figs. 1 and 2.

It is entirely possible to construct a ring in but a single piece having its outer surface bottom of the groove forming a spiral. This is illustrated in Fig. 5, in which a channel or groove is cut into the wall of the piston of spiral form, that is the base or bottom of the groove forming a spiral. As before, the thickened end 10 of the ring 11 is seated in the tapered portion of the groove and both groove and ring decrease in depth and thickness correspondingly throughout. In this form the spring 7 is seated in a socket in the thickened end 10 of the ring 11 as before, the opposite end of the spring being placed within a socket 12 in the shoulder formed in the piston itself. The action of the ring 11 is identical with that of the other forms.

It will be quite evident that due to the fact that any and all positions of my piston ring are such that a wedge action is secured, and that the back of the ring is always in surface contact with the bottom of the groove within which it is seated and the cylinder wall, there can be no rattle or slap or side movement of any kind between the piston and the cylinder wall within which it reciprocates. This is essential.

Both ring and piston may be made of any desired materials consistent with the use to which the piston is to be put and I place no limitation upon said materials.

Having thus described my invention, what I claim is:—

1. In combination, a piston provided with a peripheral groove decreasing in depth from one point to a point diametrically opposite, a piston ring of decreasing thickness seated in said groove, and means to cause movement of said ring in said groove and in a direction around the piston.

2. In combination, a piston provided with a peripheral groove decreasing in depth from one point to a point diametrically opposite, a piston ring of decreasing thickness seated in said groove, and means to cause movement of said ring in said groove and in a direction around the piston, the back of said ring maintaining surface contact with the bottom of said groove.

3. In combination, a piston provided with a peripheral groove of decreasing depth, a wedge-shaped ring seated therein, and means to cause movement of said ring around the piston in said groove.

4. In combination, a piston provided with a peripheral groove of decreasing depth, a piston ring mounted in said groove of correspondingly decreasing thickness, and a spring exerting pressure upon said ring tending to move said ring around the piston in said groove.

5. In combination, a piston provided with a peripheral groove, the bottom of said groove being eccentric to the axis of the piston, a wedge shaped ring mounted in said groove, and means to increase the combined thickness of ring and piston at any point on the ring by circumferentially moving said ring in said groove.

6. In combination, a piston provided with an eccentric groove, a split tapered ring therein contacting with the bottom of the groove having its ends separated, and means to cause the separated ends to approach each other.

7. In combination, a piston provided with an eccentric groove, a split ring mounted therein, the back of said ring maintaining surface contact with the bottom of said groove.

8. In combination, a piston having a peripheral groove of decreasing depth, a ring of correspondingly decreasing thickness mounted therein, the back of said ring maintaining surface contact with the bottom of said groove.

9. In combination, a piston provided with an eccentric groove, a split ring mounted therein decreasing in thickness from its thick to its thin end to an extent corresponding with the decreasing depth of the groove, and a spring engaging its thickened end and exerting pressure thereon to cause movement of the ring around the piston in the groove.

10. As a new article of manufacture, a two-part piston ring having a cylindrical inner and outer face, the inner face of the composite ring being eccentric to the outer face.

11. As a new article of manufacture, a composite split ring of constantly decreasing thickness, a socket in each of the thick ends, and a spring held in said socket.

12. As a new article of manufacture, a composite piston ring comprising similar complementary parts, the composite outer and inner faces of which comprise cylindrical surfaces, the inner face thereof being eccentric to the outer face.

In testimony whereof, I affix my signature.

BRUCE W. TRAYLOR.